June 13, 1950 E. A. ROOP 2,511,295
AIR FILTER

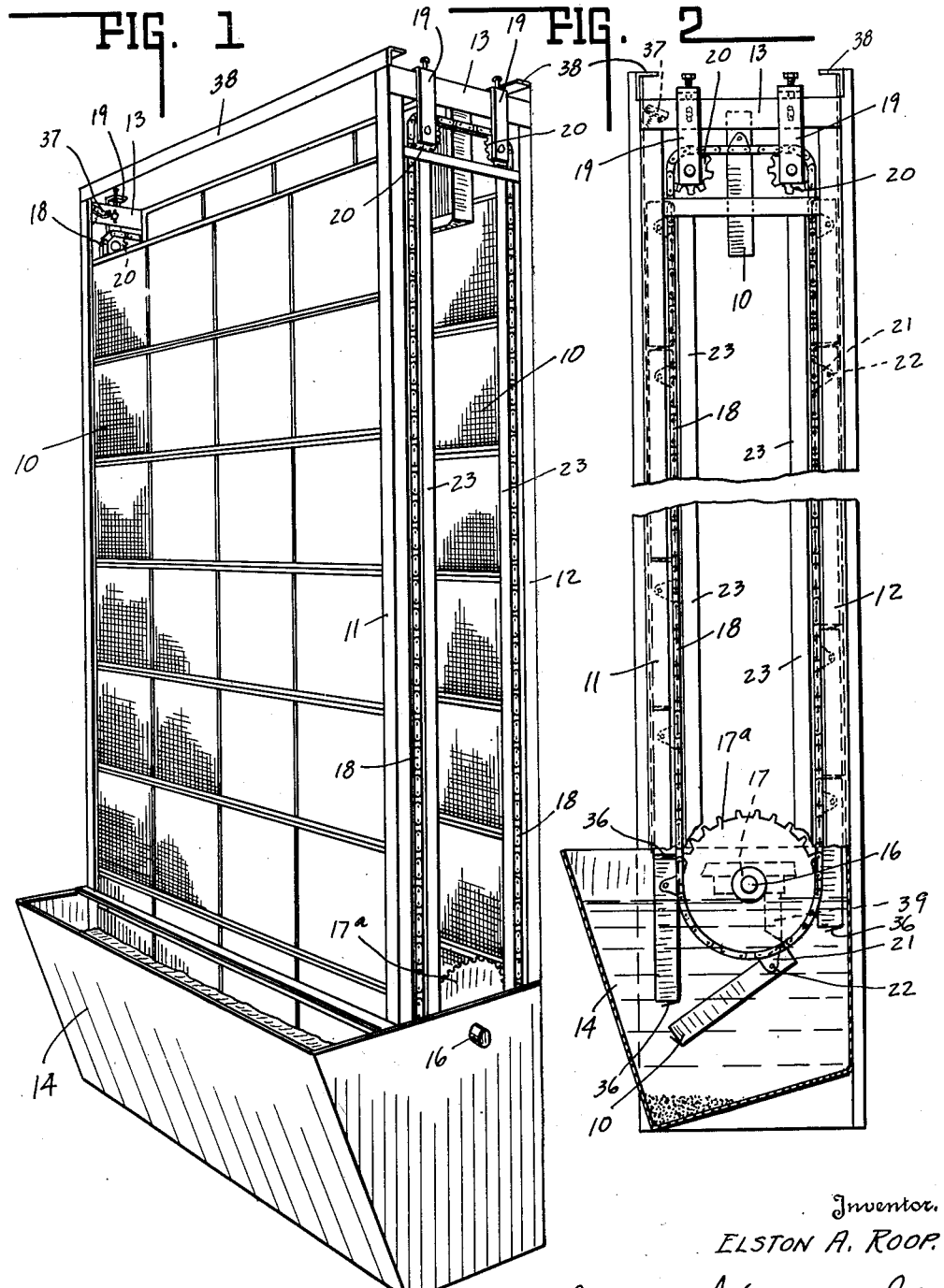

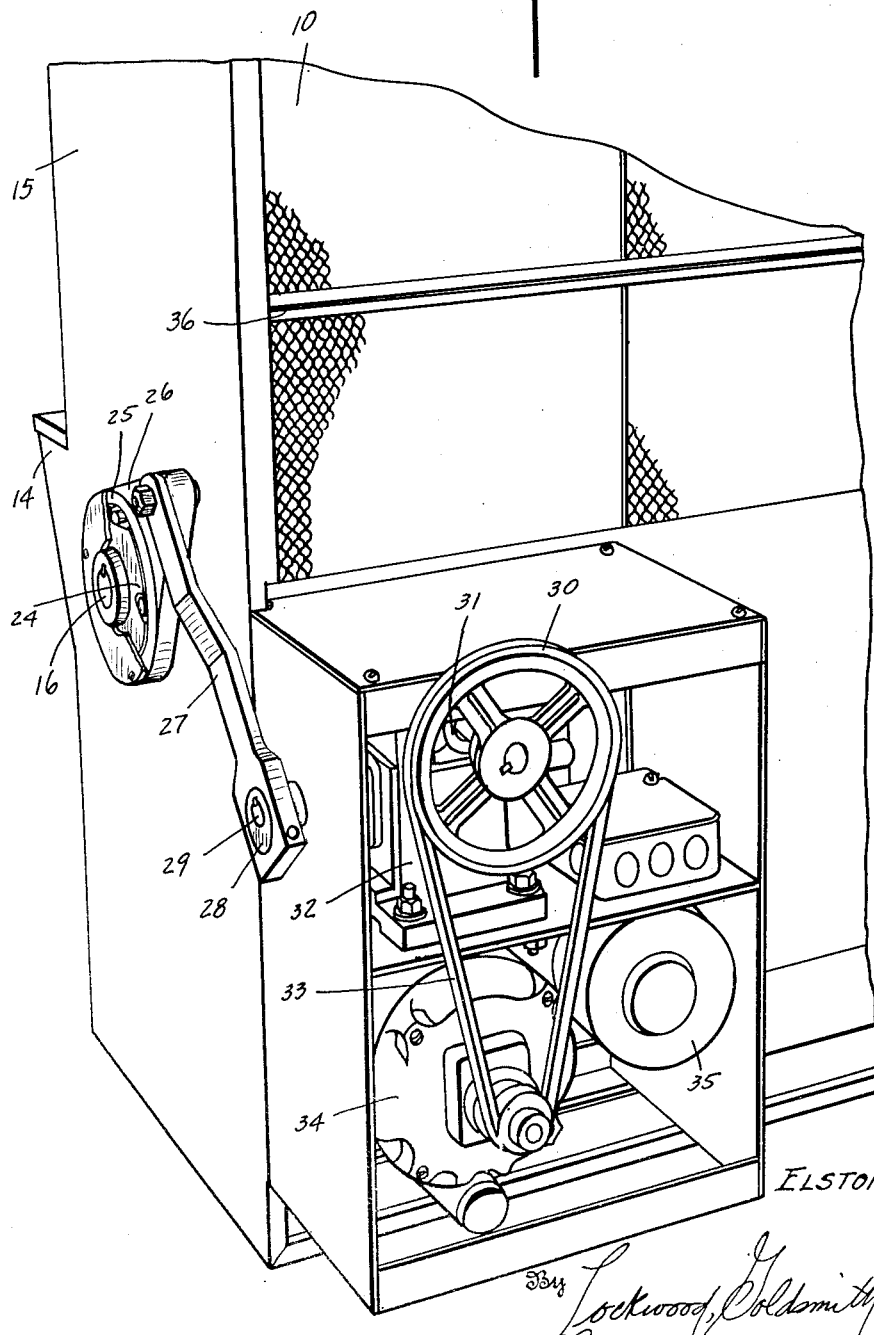

Filed Aug. 22, 1947 3 Sheets-Sheet 3

INVENTOR.
ELSTON A. ROOP.
BY
Lockwood, Goldsmith & Galt
ATTORNEYS.

Patented June 13, 1950

2,511,295

UNITED STATES PATENT OFFICE 2,511,295

AIR FILTER

Elston A. Roop, Louisville, Ky., assignor to Continental Air Filters, Inc., Louisville, Ky., a corporation Application August 22, 1947, Serial No. 770,095

4 Claims. (Cl. 261—80)

This invention relates to a self-cleaning air filter wherein a series of filter cells are periodically immersed and passed through an oil bath for oil coating the filter media and removing dust and dirt laden oil accumulated thereon.

It is the purpose of the invention to improve upon that type of filter wherein the filter cells are suspended so that they travel in a Ferris wheel manner to provide a filtering curtain in which the cells on one side move upwardly and those of the opposite side move downwardly, but without changing their relative positions. Thus, the air enters and leaves the same side of each filter cell, regardless of whether it is in the front or back section of the filter curtain, as disclosed in Letters Patent No. 1,836,131, granted December 15, 1931, for "Gas filter."

One feature of the invention resides in the self-cleaning action of the filter cells as they are immersed in the oil bath. Thus, there is provided a camming mechanism acting upon each filter cell as it enters the bath to quickly throw it upwardly from its normal vertical position toward a horizontal position with a swishing action such as to cause the oil to be forced through the media and remove the looser agglomeration of dust particles. The cell is then maintained in its near horizontal position for a sufficient time, by reason of the intermittent drive, to break any surface tension of the oil which binds the accumulated dust whereupon the dust particles will become freely suspended in the liquid. Thereupon the cell is released to quickly drop back to vertical position giving it a swish of oil therethrough in the opposite direction which acts to wash out that portion of the liquid in which the dust particles are suspended.

A further feature of the invention resides in a tilting action at the top of the screen by means of which each of the cells, as their direction of travel changes from the vertical to the horizontal movement, will be swung toward a horizontal position to facilitate drainage of accumulated liquid from their top and bottom surfaces. Thus, the filter liquid which is normally held between two adjacent cells by capillary action is caused to drain off of the top and bottom surfaces and fall into the space between the front and back sections of the curtain, and hence into the liquid reservoir. This action obviates the possibility of this excess liquid being carried to the back side of the curtain and blown out into the air stream behind the filter.

A still further feature of the invention resides in the provision of sealing elements provided along the lower edge of each cell for preventing the passage of air other than through the filter media.

The full nature of the invention will be understood from the accompanying drawings and the following description and claims.

Fig. 1 is a perspective view of the air filter.

Fig. 2 is a side elevation thereof with parts removed and in section.

Fig. 3 is a perspective view of the intermittent driving mechanism with parts broken away.

Figure 4:
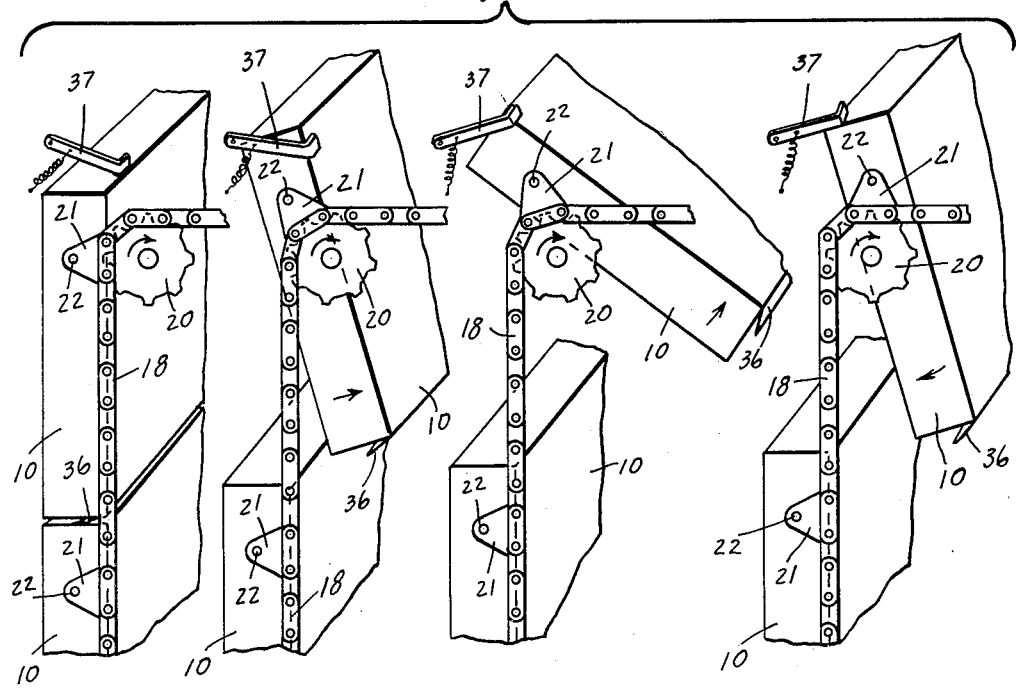
Fig. 4 is a diagrammatical illustration of the upper tilting action as the filter cell changes direction from the vertical to the horizontal movement.

In the drawings there is shown an air filter embodying an upright framework in which a series of panels comprising the filter cells 10 are caused to travel with a periodic intermittent movement with a Ferris wheel-like action. On the intake side of the filter the cells move in an upward direction after being cleaned in a liquid bath which may comprise a mineral oil. That section of the filter in which the cells move upwardly forms a front curtain section for receiving the air flow. The outlet side of the filter in which the cells move downwardly is in the form of a second curtain section through which the air is caused to pass from the filter after having passed through the cells in the first mentioned section.

The intake section of the filter includes the front upright angle frame members 11 which provide a track receiving the ends of the filter cells along which they are moved in their upward direction. The upright frame members 12 provide a similar track for receiving the ends of the filter cells and guiding them in their downward movement. Suitable cross frames 13 are provided at the top of the filter and a liquid reservoir 14 is provided at the bottom of the filter and serves to support said upright frame members. An end panel 15 may be secured over said members to enclose the intermediate space between the intake and outlet sections.

Extending transversely through the reservoir 14 there is a driving shaft 16 mounted in the bearings 17 carried by the end panels of the reservoir. Within the reservoir and at each end thereof there is a sprocket wheel 17a. About each sprocket wheel an endless carrying chain 18 passes to be intermittently driven thereby.

At the upper end of the filter there are a pair of brackets 19 secured to the cross frames 13 in spaced relation to each other, each bracket carrying an idler sprocket 20 about which the chain 18 passes. By reason of the spaced relation of the idler sprockets 20 the upper loop of the chain travels in a horizontal direction.

Each filter cell is pivotally suspended to a link of the sprocket chain at a point adjacent to but slightly above its center of gravity. For this purpose there is provided a bracket 21 secured to a link of the chain having a pivot stud 22 supporting the filter cell, one at each end thereof. The brackets 21 are so spaced as to pivotally suspend the filter cells so that their upper and lower edges lie in close relation to the edges of the adjacent cells. For providing a protection and guide for the chain, the upright guide members 23 are mounted adjacent to and in spaced relation to the upright members 11 and 12, respectively.

The chains 18, and therefore the filter cells carried thereby, are caused to be periodically driven by the shaft 16. For this purpose the shaft has a ratchet member 24 keyed thereto surrounded by the ratchet sleeve 25 comprising an inner portion of the ratchet lever 26. The ratchet lever is pivotally connected by the link 27 to an eccentric 28 keyed to the drive shaft 29. Said shaft causes the eccentric 28 to rotate in the actuating end of the link 27 for imparting reciprocal movement thereto. The shaft 29 is driven by the drive pulley 30 at greatly reduced speed through a shaft mounted in the gear box 32.

The pulley 30 is driven by the belt 33 from the motor 34. Through suitable timing mechanism mounted in the casing as indicated at 35 the motor 34 will be caused to operate during predetermined periods of time.

During such periods of time as the motor 34 is driven it imparts a relatively slow rotary movement to the shaft 16 imparting a slow periodic movement to the chain 18 carrying the filter cells. Thus, the filter cells are given an extremely slow intermittent movement during predetermined periods of time.

One edge of the cells are provided with sealing elements arranged to form a seal between adjacent cells. The sealing elements may be of any suitable character, herein shown as flexible metal strips 36.

As will be observed in Figs. 1, 2, and 4, as a filter cell is carried transversely by the upper transverse section of the chain it is tilted toward a horizontal position to permit drainage of excess filter liquid from its upper and lower surfaces. Through this movement it is transferred from the front inlet section of the curtain to the rear outlet section but without altering the relative positions of its faces. For this purpose there is provided a deflecting element here shown in the form of a catch 37 secured to the top cross bar 13. Said catch is positioned to be engaged by the upper portion of the cell as it moves upwardly and rearwardly to start its lateral movement. By engagement with said catch its lower edge is caused to tilt inwardly and upwardly from its normal vertical position as it passes over the sprocket 20. As its bracket 21 swings from horizontal toward vertical position in passing over the sprocket, it is raised more rapidly than the oncoming adjacent cell so that the sealing element is released from the edge of the oncoming cell to permit the tilting movement caused by the catch 37. Said catch maintains the cell in its tilted position as it approaches the rear outlet section of the curtain, whereupon it is released to drop back to vertical position. Thus, while carried in its tilted and near horizontal position, the excess liquid will have drained away.

Figure 5:
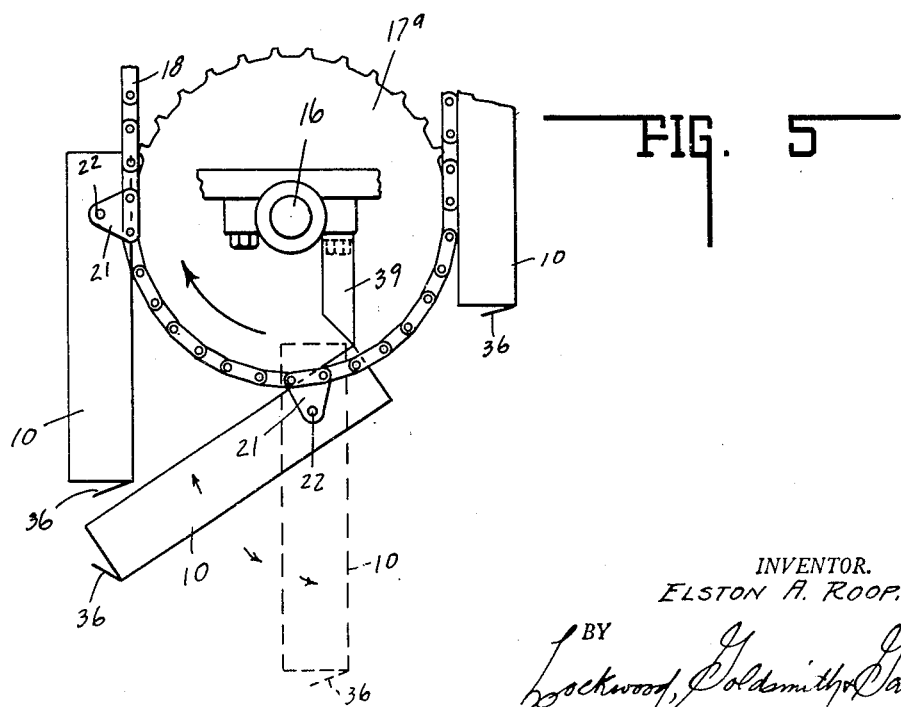
Fig. 5 is a diagrammatical illustration showing the relative positions of the filter cells as they are immersed into the liquid bath.

The bearings 17 at the bottom of the filter each carry a camming plate 39, as shown in Fig. 5. As the filter cell is carried by the chain about the sprocket wheels 17, its upper forward edge is restrained by the camming plate 39. As the movement continues toward the underside of the sprockets the cell is caused to be swung toward a horizontal position within the liquid bath of the reservoir 14.

The upwardly swinging movement of the cell causes a thrust of liquid through the cell media which acts to flush the looser accumulation of dust particles therefrom. By reason of the intermittent driving action the cell will remain in its near horizontal position for a period of time during which the surface tension of the liquid which binds the dust to the surfaces of the filter media is broken. Upon further movement about the underside of the sprockets, when the upper edge of the cell carries free of the camming plate 39, it will then drop to its normal vertical position with a swish of liquid therethrough acting to wash out of the filter media that portion of the liquid in which the dust particles are suspended. Thereupon the cell is carried by the chains toward the front of the filter to start its upward travel along the front inlet section after having thus been cleaned of accumulated dust particles and refaced with the coating liquid, such as mineral oil.

I claim:

1. An air filter including an upright frame structure, endless carrying belts at each side of said structure adapted to travel up one side and down the other, lower carrying wheels for said belts at the bottom of said structure, spaced pairs of upper wheels for supporting said belts at the top thereof to pass in horizontal direction therebetween, means for driving said belts, a series of filter cells pivotally suspended between said belts above their centers of gravity to normally hang in a vertical position with their upper and lower edges in close abutting relation, each of said cells having a sealing element extending along one edge thereof into sealing relation with the next adjacent cell, and a deflecting element at the upper end of said frame structure operably engageable by the upper portion of each cell as it passes over one pair of upper wheels for swinging it toward a horizontal position during its horizontal travel.

2. An air filter including an upright frame structure, endless carrying chains carried by said structure to travel up one side thereof and down the other side, carrying sprockets for said chains at the bottom of said structure, a pair of laterally spaced upper sprockets for supporting each chain at the top of said structure, means for driving said chain, a series of filter cells each being pivotally supported above its center of gravity at its opposite ends between said chains so as to normally hang therefrom in a vertical position with their respective upper and lower edges in close abutment, a sealing element depending from the lower edge of each cell to extend into sealing relation with the upper edge of the cell carried adjacent thereto, and a deflecting element mounted at the top of said structure engageable by the upper portion of each cell as it is carried about the near upper sprockets from the vertical to the horizontal direction of travel, said deflecting element causing said engaging cell to swing inwardly of the next following cell toward a horizontal position.

3. An air filter including an upright frame structure, endless carrying belts at each side of said structure adapted to travel up one side and down the other, lower carrying wheels for said belts at the bottom of said structure, spaced pairs of upper carrying wheels for supporting said belts at the top thereof to pass in horizontal direction therebetween, means for driving said belts, a series of liquid coated filter cells pivotally suspended between said belts above their centers of gravity to normally hang in a vertical position with their upper and lower edges in close abutting relation, each of said cells having a sealing element extending along one edge thereof in sealing relation with the next adjacent cell, and a catch at the upper end of said frame structure engageable by the upper portion of each cell as it passes over the near pair of upper wheels for swinging it toward a horizontal position during its horizontal travel to permit liquid drainage from its upper and lower surfaces.

4. An air filter including an upright frame structure having a reservoir at the bottom thereof for containing a cleaning liquid, a pair of driving wheels mounted at the bottom of such structure to extend into the cleaning liquid, spaced pairs of idler wheels mounted at the top thereof, a pair of endless carrying belts extending about said wheels, means for intermittently driving the lower wheels to cause said belt to travel through the cleaning liquid and from the reservoir up one side of said structure and down the opposite side, a series of filter panels pivotally suspended between said belts above their center of gravity and normally hung in vertical position and edge to edge abutment, and a deflecting element at the upper end of said frame structure positioned to be operably engaged by each panel as it passes over one pair of said idler wheels for swinging said panel toward a horizontal position to drain liquid from the upper and lower edges thereof while passing between said spaced pairs of idler wheels.

ELSTON A. ROOP.

REFERENCES CITED

The following references are of record in the file of this patent:

UNITED STATES PATENTS

| Number | Name | Date |
|---|---|---|
| 353,293 | Denton | Nov. 30, 1886 |
| 1,836,131 | Richter | Dec. 15, 1931 |
| 2,070,872 | Strindberg | Feb. 16, 1937 |

FOREIGN PATENTS

| Number | Country | Date |
|---|---|---|
| 381,901 | Great Britain | Oct. 13, 1932 |